United States Patent
Thum et al.

(10) Patent No.: US 6,616,700 B1
(45) Date of Patent: Sep. 9, 2003

(54) METHOD AND APPARATUS FOR CONVERTING VIDEO TO MULTIPLE MARKUP-LANGUAGE PRESENTATIONS

(75) Inventors: Ching Kuan Thum, Singapore (SG); Vinod Vijayalekshmi Vasudevan, Singapore (SG); Gurminder Singh, Singapore (SG)

(73) Assignee: Newstakes, Inc., Burlingame, CA (US)

(*) Notice: Subject to any disclaimer, the term of this patent is extended or adjusted under 35 U.S.C. 154(b) by 0 days.

(21) Appl. No.: 09/480,715

(22) Filed: Jan. 7, 2000

(30) Foreign Application Priority Data

Feb. 13, 1999 (SG) .............................. 9900810

(51) Int. Cl.[7] .............................. G06F 15/00

(52) U.S. Cl. .................. 715/500.1; 715/523; 345/723; 345/744; 345/747

(58) Field of Search .............................. 715/500.1, 523; 345/723, 744, 747

(56) References Cited

U.S. PATENT DOCUMENTS

| | | | |
|---|---|---|---|
| 4,930,021 A | 5/1990 | Okada | 358/451 |
| 5,236,199 A | 8/1993 | Thompson, Jr. | 273/439 |
| 5,379,421 A | 1/1995 | Palazzi, III et al. | 395/600 |
| 5,530,852 A * | 6/1996 | Meske et al. | 709/206 |
| 5,635,982 A * | 6/1997 | Zhang et al. | 348/231.99 |
| 5,680,225 A | 10/1997 | Hirabayashi et al. | 358/451 |
| 6,342,904 B1 * | 1/2002 | Vasudevan et al. | 345/723 |
| 6,404,978 B1 * | 6/2002 | Abe | 386/55 |

FOREIGN PATENT DOCUMENTS

GB  2312078  10/1997

OTHER PUBLICATIONS

Behzad Shahraray, David C. Gibbon, Automatic Generation of Pictorial Transcripts of Video Programs,May 1995, SPEI vol. 2417, pp. 1–8.*

Cheong, T.L. et al. "A Statistical Approach to Automatic Text Extraction" *Asian Library Journal*, vol. 3, No. 1, (1993) pp. 46–54.

ISO/IEC 11172–1:1993 "Information Technology—Coding of Moving Pictures and Associated Audio for Digital Storage Media at up to about 1,5 Mbit/s".

ISO/IEC 11172–1:1993/COR.2:1999 "Information Technology—Coding of Moving Pictures and Associated Audio for Digital Storage Media at up to about 1,5 Mbit/s" Technical Corrigendum 2.

Shaharay, B., et al., "Automatic generation of pictorial transcripts of video programs" *SPIE*, vol. 2417, (1995) pp. 512–518.

* cited by examiner

Primary Examiner—Heather R. Herndon
Assistant Examiner—Matthew Ludwig
(74) Attorney, Agent, or Firm—Ladas and Parry

(57) ABSTRACT

A system is described for converting full motion video (102) into multiple markup language (HTML, WML, BHTML) presentations (140) targeted to different devices (144–152) and users. The markup language presentations (140) consist of different combinations of important visuals, audio and transcript of the full motion video (102), depending on the audio and visual/text display capability of the devices (144–152) and the user's requirements (112, 116). The important visuals are keyframes selected (118) from the video (102) based on significance measure (114, 112) associated to different segments in the video (102). The combinations of audio, visuals and transcript can be played in a synchronous/asynchronous manner. The user can control the rate of visuals and transcript displayed.

21 Claims, 4 Drawing Sheets

METHOD AND APPARATUS FOR CONVERTING VIDEO TO MULTIPLE MARKUP-LANGUAGE PRESENTATIONS

FIELD OF THE INVENTION

The present invention relates to the field of video processing, and in particular to systems for preparing multimedia presentations based on video content.

BACKGROUND

Video data contains both visual and audio information that is time based, i.e. organised in time sequence. Consequently, even a small segment or clip of video contains a large amount of information. With the advent of digital technology, compression techniques have been applied to digital video to remove redundant information from digital video and thereby reduce the amount of storage capacity and bandwidth required to store and transmit digital video. Nonetheless, even with compression, the storage capacity and bandwidth requirements remain high.

Ordinarily, video is prepared for delivery over a channel, or medium, with high transmission capacity. However, with the wide proliferation of digital technology and the popularity of Internet dial-up connections with the general public, there are increasing demands for video information to be provided by lower capacity channels such as the Internet. Transmitting video information via such low capacity channels presents special challenges.

These challenges are further compounded by the proliferation of devices such as cellular phones, palm-top computers and TV set-top boxes, which can be used to display or present digital information. These devices have significantly differing audio, visual and text presentation capabilities. Not uncommonly, such devices handle audio at different bit rates and frequency ranges. Further, their visual display has different colour depths, and they may be capable of text display having limited lines and characters. Generally speaking, multimedia personal computers have high presentation capabilities, while cellular phones have low capabilities for displaying visual information, for example.

Thus, a need clearly exists for a system of processing full-motion video content for presentation on a variety of devices that have widely differing audio and visual/text display capabilities and different bandwidth requirements.

SUMMARY

In accordance with a first aspect of the invention, there is disclosed a method of converting a video into multiple markup language presentations for different devices and users. The method includes the step of creating a video database containing shot and key frame information of the video. It also includes the step of generating at least one of audio, visual and textual content for presentation dependent upon display capabilities of the different devices and user specified criteria. The generating step includes the sub-steps of: if the presentation is to contain visual content, determining a heuristic measure for a desired image for display on the different devices, the heuristic measure being dependent upon either a Display Dependent Significance Measure (DDSM), or the DDSM and a user supplied significance measure; if the presentation is to contain visual content, ranking and selecting one or more images from the video to be displayed dependent upon the heuristic measure; if the presentation is to contain audio content, extracting an audio stream from the video; if the presentation is to contain textual content, selecting the textual content from video annotation and/or a transcript associated with the video. The method also includes the step of creating multiple static and/or dynamic markup language documents dependent upon the display capabilities of the different devices and the user specified criteria for different presentations on the different devices, each document containing at least a portion of the generated audio, visual and textual content catering for a presentation on a corresponding device.

Preferably, the method includes the sub-step of, if the presentation is to contain visual content, converting the one or more selected images to different sizes and colour depths dependent upon respective display requirements of the devices.

Preferably, the method includes the sub-step of, if the presentation is to contain audio content, converting the audio stream to have different sampling rates, number of channels, compression ratios and/or resolutions for different delivery audio channels.

Preferably, the method includes the sub-step of, if the presentation is to contain textual content, generating the timed-transcript.

The presentations may include synchronous and/or asynchronous combinations of audio, visual, and text content. The combinations may include synchronised audio with visuals, synchronised audio with text, synchronised audio with text and visuals, synchronised text and visuals, and static text with visuals.

Preferably, the Display Dependent Significance Measure (DDSM) is dependent upon the information content of the image.

In accordance with a second aspect of the invention, there is disclosed an apparatus for converting a video into multiple markup language presentations for different devices and users. The apparatus includes a device for creating a video database containing shot and key frame information of the video. It also includes a device for generating at least one of audio, visual and textual content for presentation dependent upon display capabilities of the different devices and user specified criteria. The generating device includes: a device for, if the presentation is to contain visual content, determining a heuristic measure for a desired image for display on the different devices, the heuristic measure being dependent upon either a Display Dependent Significance Measure (DDSM), or the DDSM and a user supplied significance measure; a device for, if the presentation is to contain visual content, ranking and selecting one or more images from the video to be displayed dependent upon the heuristic measure; a device for, if the presentation is to contain audio content, extracting an audio stream from the video; and a device for, if the presentation is to contain textual content, selecting the textual content from video annotation and/or a transcript associated with the video. The apparatus also includes a device for creating multiple static and/or dynamic markup language documents dependent upon the display capabilities of the different devices and the user specified criteria for different presentations on the different devices, each document containing at least a portion of the generated audio, visual and textual content catering for a presentation on a corresponding device.

In accordance with a third aspect of the invention, there is disclosed a computer program product having a computer readable medium having a computer program recorded therein for converting a video into multiple markup language presentations for different devices and users. The computer program product includes a module for creating a video database containing shot and key frame information of the video. It also includes a module for generating at least one of audio, visual and textual content for presentation dependent upon display capabilities of the different devices and user specified criteria. The generating module includes: a module for, if the presentation is to contain visual content, determining a heuristic measure for a desired image for display on the different devices, the heuristic measure being dependent upon either a Display Dependent Significance Measure (DDSM), or the DDSM and a user supplied significance measure; a module for, if the presentation is to contain visual content, ranking and selecting one or more images from the video to be displayed dependent upon the heuristic measure; a module for, if the presentation is to contain audio content, extracting an audio stream from the video; and a module for, if the presentation is to contain textual content, selecting the textual content from video annotation and/or a transcript associated with the video. The computer program product also includes a module for creating multiple static and/or dynamic markup language documents dependent upon the display capabilities of the different devices and the user specified criteria for different presentations on the different devices, each document containing at least a portion of the generated audio, visual and textual content catering for a presentation on a corresponding device.

BRIEF DESCRIPTION OF THE DRAWINGS

A small number of embodiments of the invention are described hereinafter with reference to the drawings, in which.

DETAILED DESCRIPTION

Figure 1A:
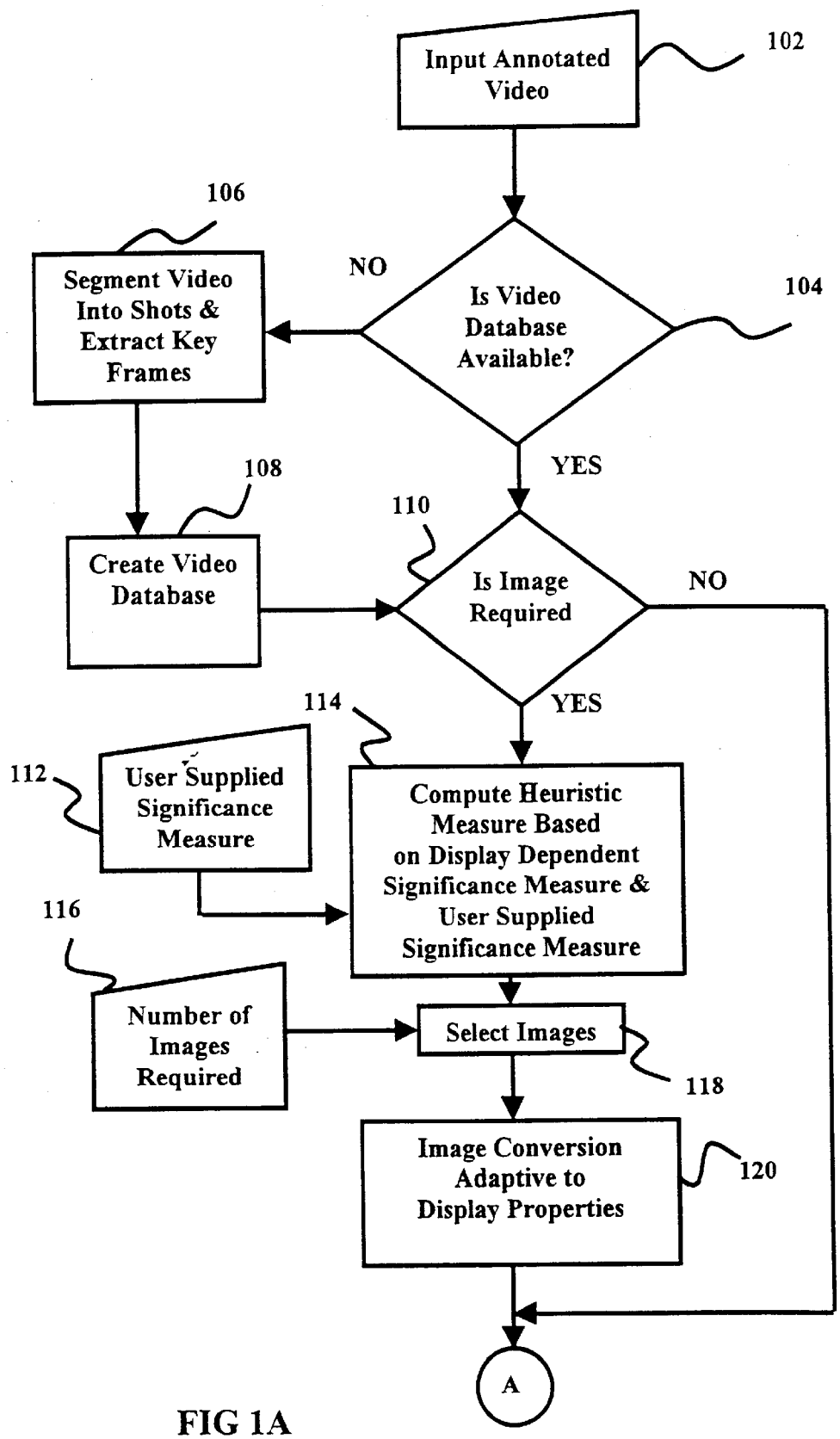
FIGS. 1A–1C are a flow diagram illustrating a process of converting video into multiple Markup-Language presentations targeted at different display devices and users in accordance with a first embodiment of the invention.

A method, an apparatus, a computer program product, and a system for converting video into multiple markup-language presentations are disclosed. In the following description, numerous specific details are set forth including content addressing techniques. It will be apparent to one skilled in the art, however, that the present invention may be practised without these specific details. In other instances, well-known features are not described in detail so as not to obscure the present invention.

The method, apparatus, computer program product and system according to the embodiments of the invention are advantageous in that full-motion video can be converted into multiple markup-language (HTML, WML, BHTML, etc.) presentations targeted to different display or presentation devices and users, dependent upon the requirements of the different devices and users. A markup language defines information to be added to the content of a document as an aid to processing it. The resulting, created presentations have different combinations of important visuals, audio data and text transcript of the full motion video, dependent upon the audio and visual/text display capability of the display devices and the user's specific requirements.

With the popularity of Internet dial-up connections and the proliferation of devices like cellular phones, palm-top computers and TV set-top boxes, there is a need to repurpose video content for presentation catering to various devices having widely differing audio and visual/text display capabilities and different bandwidth requirements.

The disparity of the huge user base also drives the need for a high degree of personalisation in terms of layout, content selection and sequencing of a presentation. A markup language is typically defined based on the limitations of its target platform. Thus, the ability of the embodiments of the invention to automatically transform a single source of video content into different markup-language presentations in a user-defined manner, upon user request, greatly reduces the burden of content and service providers. Consequently, there is no need to create duplicate sets of content to cater for different devices having different bandwidth requirements and audio and visual/text display capabilities.

A presentation of video content involving synchronised text and visuals, text and audio, audio and visuals, or text only requires much less storage and lower bandwidth. It is also capable of reaching a larger audience in comparison with full-motion video. Still further, a video is a presentation that has a fixed pace. The ability to control the rate of display of visuals/text in the case of a synchronised presentation provides a higher degree of interactivity to suit a user's pace of understanding the video content. For users who are hearing/vision impaired, for example, they can customise the presentation to suit their specific needs. Thus, the embodiments of the invention allow the content of a video presentation to be adjusted to the needs of a target audience.

The embodiments of the invention do not simply convert existing markup language page into a format that suits the capabilities of a single targeted device, but instead re-purpose full-motion video into multiple markup language presentations. The embodiments take care of different measures of desired images and different presentation requirements of the different devices. For example, a user with a cellular phone may prefer listening to a news broadcast in audio form instead of reading the text on a small phone screen. The embodiments of the invention are able to cater to such requirements. Further, a visual such an image with big and very few objects or a statistical chart may be useful for display on a small phone screen, but not an image with complex content. The embodiments of the invention are able to effectively deal with such considerations.

The embodiments of the invention intelligently rank and select images from keyframes or shots obtained from a video based on a Display Dependent Significance Measure (DDSM) defined by the system, as well as a user supplied significance measure. Thus, for a small display of 1-bit depth, an image with one or two big objects is ranked higher than one with many small objects according to the DDSM. However, an image that contains many small objects and a lot of information is ranked higher for a full-colour desktop display. The embodiments of the invention also convert and deliver video content (audio, visuals and transcript) based on the audio and visual/text display characteristics of a targeted device in a user-defined fashion. The system tailors a presentation interface to the specific needs of users of different devices, which have different input/output (I/O) interfaces. Consequently, a user can control the rate of display of the video content to suit the user's pace.

Figure 1B:
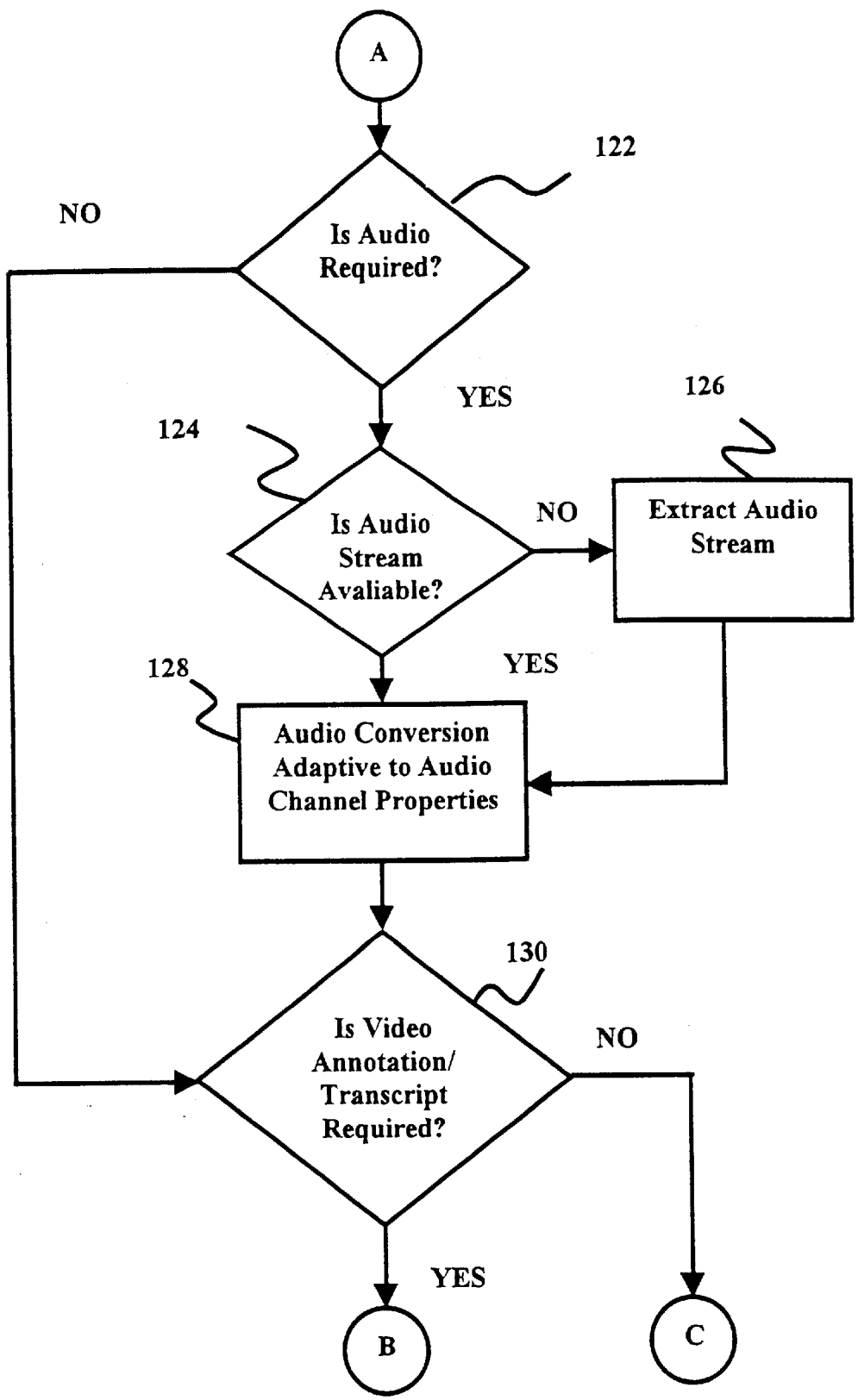
Figure 1C:
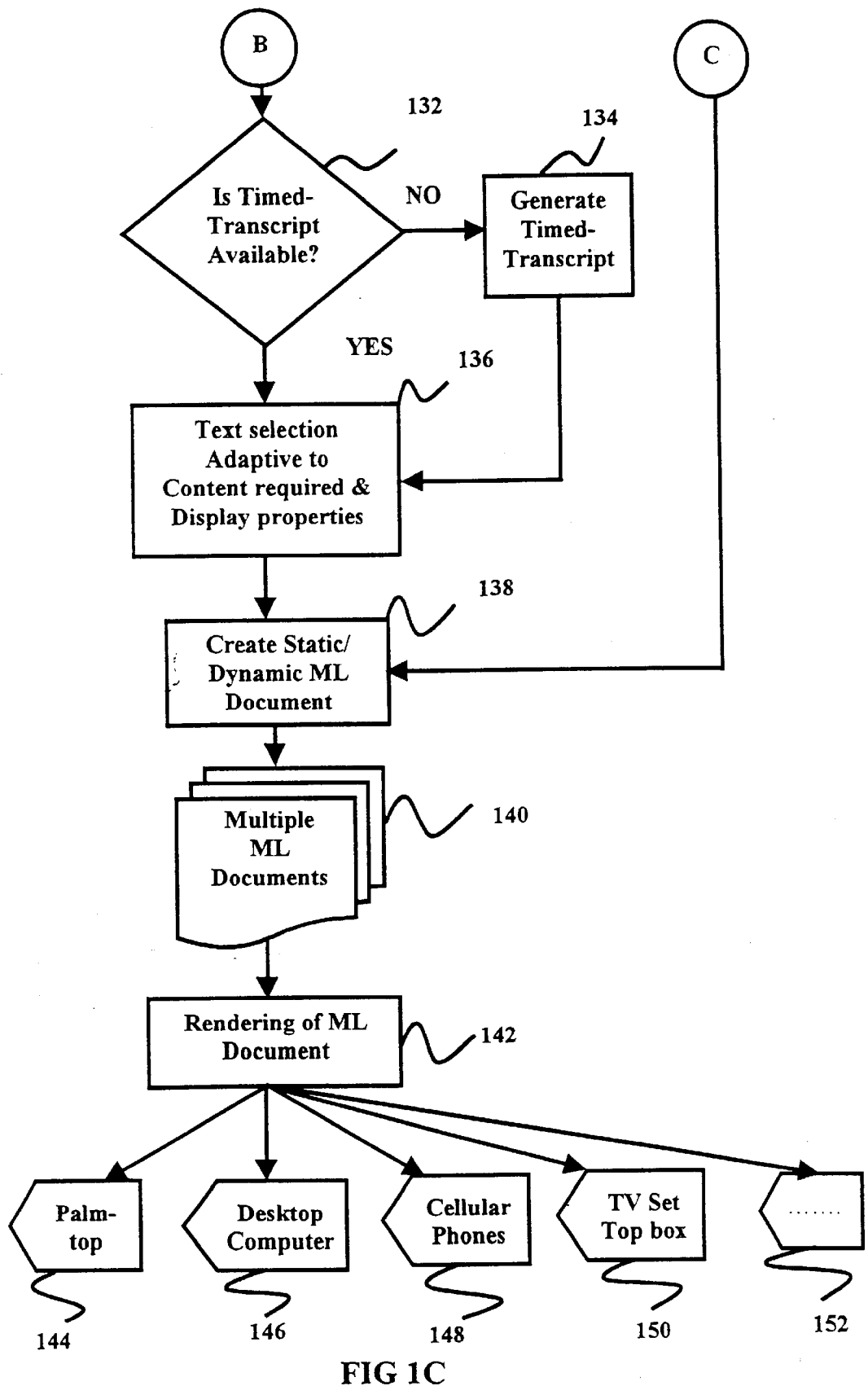

FIGS. 1A–1C are a flow diagram illustrating a process of generating from full-motion video multiple markup-language presentations in accordance with a first embodiment of the invention. Using this process, a user can define the content to be delivered in a presentation based on the person's preferences. For example, the user may prefer to read domestic news and ignore international news. On the other hand, a visually impaired person may prefer or require listening to an audio stream of a video, instead of reading the transcript and images. Processing commences in step 102 by inputting annotated video. In decision block 104, a check is made to determine if the video database is available. If decision block 104, returns true (YES), processing continues at decision block 110. Otherwise, if the decision block 104 returns false (NO), processing continues at step 106.

In step 106, the input annotated video is segmented into video shots, and keyframes are extracted from the video shots. A video stream is segmented into multiple shots based on visual effects such as fade in, fade out, etc. For each shot, key still images (keyframes) are extracted that contain more information and are more representative of the shot. Thus, key frames are frames that denote important events that can serve as an abstract of a video segment. Any of a number of known video segmentation and extraction techniques can be practised. Several automatic video segmentation and keyframe extraction techniques are described in U.S. Pat. No. 5,635,982 issued to Zhang, et al., on Jun. 3, 1997, the disclosure of which is incorporated herein by cross-reference. In step 108, the video database is created. The video database includes information such as the start frame, end frame, and key frames of each shot. It also includes annotations or descriptions of the shots and key frames, which may be entered manually or through an automated process. Processing then continues at the decision block 110.

In the decision block 110, a check is made to determine if at least one image is required for inclusion in the presentation. If decision block 110 returns false (NO), processing continues at decision block 122. Otherwise, if the decision block 110 returns true (YES), processing continues at step 114. A user supplied significance measure can preferably be input in step 112, which is provided as input to the step 114. The user supplied significance measure is a measure of a desired shot/images based on user defined criteria. For example, the shot that has the longest duration may be the most significant shot, and the key frame with the longest duration in the most significant shot may be the most important key frame. In this manner, the user can define the video content that is to be delivered based on that person's preferences using well-known techniques. In the step 114, a heuristic measure is computed based on a Display Dependent Significance Measure (DDSM) and preferably the user supplied significance measure from the step 112. The DDSM is a measure of a desired image(s) computed based on the characteristics of targeted display devices. For a small display of 1-bit depth, an image with one or two big objects is ranked higher than one with many small objects according to the DDSM. Contrarily, an image that contains many small objects and a lot of information is ranked higher for a full-colour desktop display.

In step 118, the key frames extracted from the video are ranked based on the heuristic measure determined in the step 114, which preferably combines the DDSM and user supplied significance measure. Further, the key frames with higher ranks are then selected depending on the number of images required in a particular presentation.

The selection of one or more images in step 118 is preferably also dependent upon the number of images required by the user; which can be input by the user in step 116 as input to the step 118. In step 120, the selected one or more images are converted for adaptation to the properties of the display channel. Extracted keyframes are converted into images of different colour depth and different size, which are optimised to be displayed on various devices having different display capabilities and bandwidth requirements. This can be done using any of a number of techniques well known to those skilled in the art. For example, a full-colour image can be converted to one for display on a cellular phone having a 1-bit depth and a maximum width of 80 pixels. Image reduction is carried out by colour depth reduction, spatial resolution reduction, or both, while keeping the primary content viewable. Two important aspects for consideration are: (1) usually image reduction involves one type of reduction only, and (2) the preferred resolution technique involves reduction by upto a factor of 6/7 in dimension, together with colour depth reduction. Preferably, an image is subsampled to the desired size, and then the subsampled image is converted to a grey-level image using an illumination component (e.g., available in YUV or HSV colour formats, or computed using well-known techniques–grey value=(red+green+blue)/3, followed by grey-level quantisation to two levels). For devices supporting grey level images, the grey-level need not be quantised, but can used directly. Other exemplary colour reduction techniques are described in U.S. Pat. No. 4,930,021 issued to Okada, et al., on May 29, 1990 and U.S. Pat. No. 5,680,225 issued to Hirabayashi, et al., on Oct. 21, 1999. Processing then continues at the decision block 122.

In decision block 122, a check is made to determine if audio data is required in the presentations. If the decision block 122 returns false (NO), processing continues at decision block 130. Otherwise, if the decision block returns true (YES), processing continues at decision block 124. In the decision block 124, a check is made to determine if an audio stream is available in the video database. If the decision block 124 returns true (YES), processing continues at step 128. Otherwise, if the decision block 124 returns false (NO), processing continues at step 126. In the step 126, the audio stream is extracted from the video using any of a number of techniques well known to those skilled in the art. In a number of video formats, video and audio streams are coded separately. In MPEG, for example, data are packaged in "packets". Each packet has a header, and one field in the header is the packet type, allowing differentiation of packets. Based on such a packet type, a specific stream (video or audio) can be extracted from the original video stream. In this connection, reference is made to the MPEG specification in ISO/IEC 11172-1, Information Technology—"Coding of Moving Pictures and Associated Audio for Digital Storage Media at up to About 1.5 Mbits/s", Part 1: System. Processing then continues in the step 128.

In the step 128, the audio stream is converted for adaptation to the properties of the desired audio channel using techniques well known to those skilled in the art. The converted audio stream is optimised to be played by various devices having different audio playback capabilities and bandwidth requirements. This includes devices that have different sampling rates, numbers of channels and frequency ranges. For instance, a stereo audio stream of 16-bit resolution and full audible range (~20 KHz) may be appropriate for a desktop computer with a high-speed connection to the presentation. However, the audio stream may be converted into one with a mono channel, 8-bit resolution and 4 KHz frequency response range to be played by a wireless device of limited bandwidth, for example. Processing then continues at the decision block 130.

In the decision block 130, a check is made to determine if video annotation/transcript is required for the presentation. If the decision block 130 returns false (NO), processing continues at step 138. Otherwise, if the decision block 130 returns true (YES), processing continues at decision block 132. In the decision block 132, a check is made to determine if a timed transcript is available corresponding to the video content. Such a transcript might be available, for example, for a video program by means of a news service such as Reuters. If the decision block 132 returns true (YES), processing continues at step 136. Otherwise, if the decision block 132 returns false (NO), processing continues at step 134. In step 134, a timed transcript is generated. The video transcript contains a text description of the video content. The sentences in the transcript can be timed for synchronous display with the audio stream or the keyframes of the video. This step is carried out preferably using a semi-auto process using well-known speech recognition or dictation software. Processing continues at the step 136.

In step 136, text is selected (and preferably summarised) from the timed transcript adapted to the content required for the presentation and the display properties. The selection of the requested video annotation and transcript can be implemented using any of a number of techniques well known to those skilled in the art. For example, a user may want to know the country, date, and abstract regarding a particular event that happened in a news broadcast, but not want to review the detailed text description and other annotations of a video. As another example, a full-text description of a video may be acceptable for presentation to a desktop computer, but a summarised description may be needed for a cellular phone, which can display only a limited number of lines and characters. An example of a technique for extracting text is described in Tong Loong Cheong and Tan Sian Lip, "A Statistical Approach to Automatic Text Extraction", *Asian Library Journal*, Vol. 3, No. 1, March 1993.

In step 138, a static/dynamic markup-language document is created dependent upon the system requirements. The video content delivered through the markup document is restricted by the audio and visual/text display capabilities of the targeted devices. The dynamic markup language document is generated dynamically. It contains a description of the content (text, image and/or audio) requested by the user and is not stored in the non-versatile memory. Unlike a dynamic document, a static markup language document is generated in a predefined manner and stored in the non-versatile memory. The eXtensible StyleSheet Language (XSL) can preferably be used to create static/dynamic markup language documents based on the system and/or user requirements. Each XSL document acts as a template, and a different XSL template is loaded to generate different markup language documents. The video content delivered through the markup document is restricted by the audio and visual/text display capabilities of the targeted devices. Alternatively, there are other methods of doing this. A Common Gateway Interface (CGI), Active Server Page (ASP), or Java Servlet with XSL, for example, can be used to generate the dynamic markup language document based on the system and/or user requirements. For example, each XSL document can act as a template, and a different XLS template is loaded to generate different markup language documents. The Common Gateway Interface (CGI), Active Server Page (ASP), or Java applet with XSL, or the like, can be used to generate differently styled markup language documents. Browsers and microbrowsers provide standard interfaces to send back a user request to a web server. The web server then queries a database server, which stores user preferences. The relevant information is then retrieved and sent back to the browser or microbrowser.

In step 140, multiple markup-language documents are created. The markup language presentations consist of different combinations of important visuals, audio and transcript of the full motion video, depending on the audio and visual/text display capability of the devices and the user's requirements. Hypertext Markup Language (HTML) and Wireless Markup Language (WML) are two examples of markup languages that can be used to describe the presentation of content on the Worldwide Web (WWW) for different platforms. As previously mentioned, each markup language is defined based on the limitations of the targeted platform. Certain markup tags, which are used to describe the different presentation formats, may be available in one markup language, but not in others. For example, table (<TABLE>) is widely used in HTML, but not defined in WML, since the displays of most wireless devices are too small to show a table. Different methods of navigation, such as a mouse for a personal computer (PC) and numeric keypads for cellular phones, contribute to the differences as well. Each markup language document contains a sequence of descriptions of how to display text and/or images in a page/deck of WWW browser or microbrowser, and what audio and/or video streams are to be played. The document may also contain scripts such as VBScript or JavaScript, for example.

In step 142, the markup language document is rendered for output to multiple devices, dependent upon the requirements of the device and the user specified choices. The devices may include a palm-top computer 144, a desktop computer 146, a cellular phone 148, a TV set top box 150, etc. Each device has a browser or microbrowser application to present the content defined in a markup language document. Whenever a user issues a request for certain content through the browser/microbrowser, a dynamic markup language document is generated and pushed back to the user or a static markup language document is retrieved. Each markup language document received by the browser/microbrowser is parsed, and the content such as images and audio stream are optimised for the targeted platform and retrieved by a web server to be delivered to the user. Various combinations of audio, images, and/or transcript can be presented in a synchronous or an asynchronous manner. For a synchronous presentation, the images/transcript are synchronised with audio (time-stamped) or images are synchronised with transcript. The user can control the rate of display in a synchronous presentation. The user can control the rate of displaying timed images and a transcript in a synchronous presentation. No synchronisation of text, audio, and/or visuals of video content is required in an asynchronous presentation.

The foregoing embodiments of the invention are advantageous in that full-motion video can be converted into multiple markup-language (HTML, WML, BHTML, etc.) presentations targeted to different display or presentation devices and users, dependent upon the requirements of the different devices and users. The resulting, created presentations have different combinations, of important visuals, audio data and text transcript of the full motion video, dependent upon the audio, visual/text display capability of the display devices and the user's specific requirements.

In this system, keyframes of the video are detected. The user is able to decide how many images the person wants to appear in the markup language page for presentation. This is done based on considerations such as shot length, the shot significance, and other user supplied criteria. The desired number of keyframes is selected, and the keyframes are incorporated in the markup language page. Several layout designs are formed, from which one can be chosen. The selected images in the markup language page are linked to the audio-visual, video and/or audio content. Thus, by clicking on the image, the user can watch the video if desired or listen to the audio only, for example. This may be done where the presentation device is a desktop computer for instance. If the presentation device is a cellular phone, the choice of images is based on the shot length, the significance of the shot, the number of objects in the frames, and other user supplied criteria. Preference is given to graphs, charts, company logos, trademarks, and the like, which may be distinguished by shape rather than colour. The image can then be linked to the audio content (rather than video, for example) to be received by the cellular phone.

Further, the embodiments are advantageous in that the system provides different image, audio and/or text content for different output devices or platforms. Still further, different layouts of content and different numbers of images are provided by the system dependent upon the display capabilities of the output devices and the user's criteria. A single set of video shots and a single layout is often not suited for all output devices, and therefore different combinations of shots and layouts are created by the system. The system selects appropriate images and layouts, and can link the images to appropriate audio and/or video.

Figure 2:
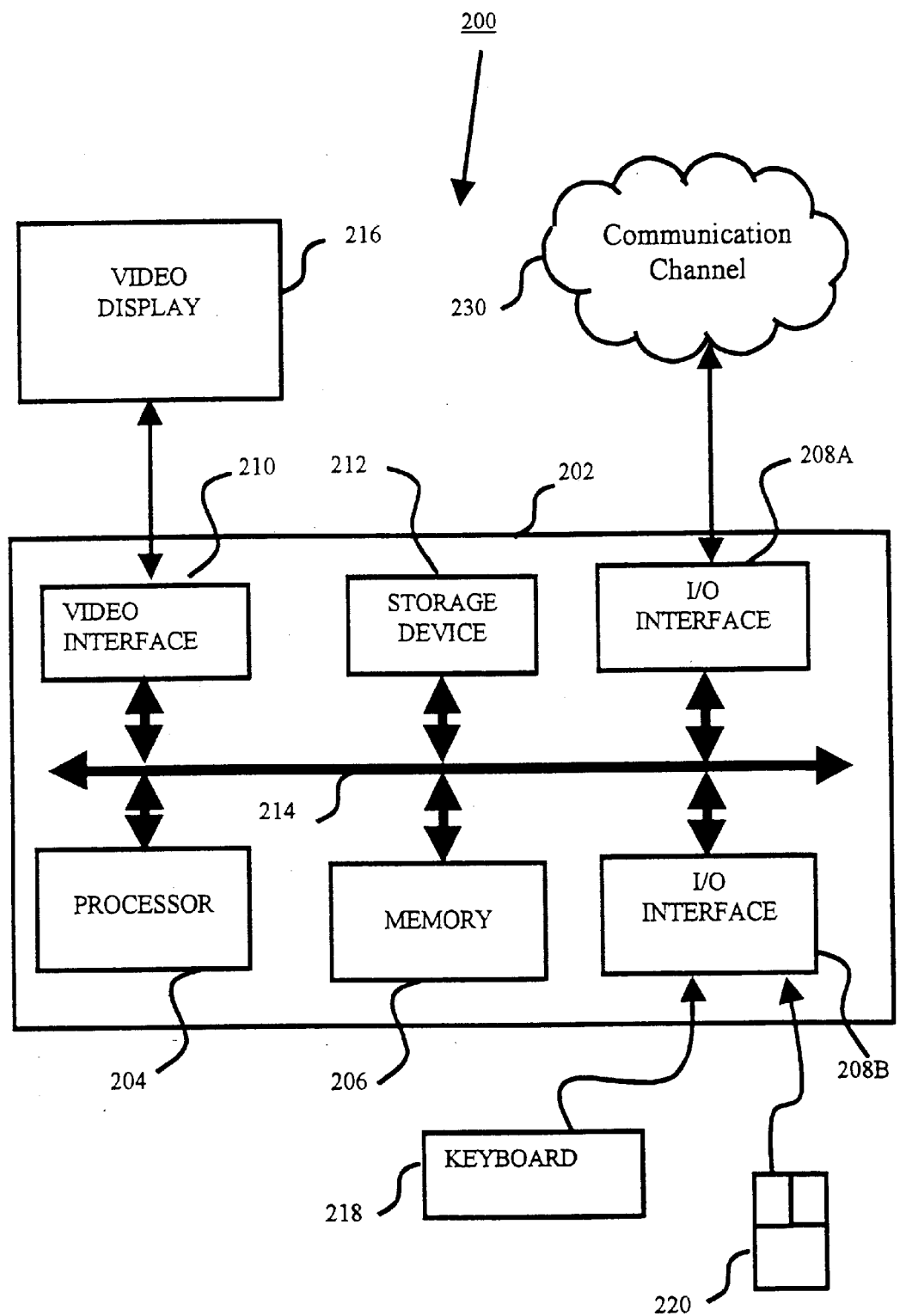
FIG. 2 is a block diagram illustrating an example of a computer system with which the process of FIG. 1 can be practised.

Preferably, the embodiments of the invention can be implemented using a computer system, such as the general-purpose computer shown in FIG. 2. In particular, the process of FIGS. 1A to 1C can be implemented as software, or a computer program, executing on the computer. The method or process steps for converting video into multiple markup language presentations for display on different devices are effected by instructions in the software that are carried out by the computer. The software may be implemented as one or more modules for carrying out the process steps. That is, a module is a part of a computer program that usually performs a particular function or related functions.

In particular, the software may be stored in a computer readable medium, including the storage devices described hereinafter. The software is loaded into the computer from the computer readable medium and then the computer carries out its operations. A computer program product includes a computer readable medium having such software or a computer program recorded on it that can be carried out by a computer. The use of the computer program product in the computer preferably effects an advantageous apparatus for converting video into multiple markup language presentations for display on different devices in accordance with the embodiments of the invention.

The computer system 200 includes the computer 202, a video display 216, and input devices 218, 220. In addition, the computer system 200 can have any of a number of other output devices including line printers, laser printers, plotters, and other reproduction devices connected to the computer 202. The computer system 200 can be connected to one or more other computers via a communication interface 208A using an appropriate communication channel 230 such as a modem communications path, an electronic network, or the like. The network may include a local area network (LAN), a wide area network (WAN), an Intranet, and/or the Internet.

The computer 202 includes: a central processing unit(s) (simply referred to as a processor hereinafter) 204, a memory 206 that may include random access memory (RAM) and read-only memory (ROM), input/output (IO) interfaces 208A and 208B, a video interface 210, and one or more storage devices generally represented by a block 212 in FIG. 2. The storage device(s) 212 can consist of one or more of the following: a floppy disc, a hard disc drive, a magneto-optical disc drive, CD-ROM, magnetic tape or any other of a number of non-volatile storage devices well known to those skilled in the art.

Each of the components 204 to 212 is typically connected to one or more of the other devices via a bus 214 that in turn can consist of data, address, and control buses. Numerous other devices can be employed as part of the computer system 200 including a video capture card, for example. The video interface 210 is connected to the video display 216 and provides video signals from the computer 202 for display on the video display 216. User input to operate the computer 202 can be provided by one or more input devices via the interface 208B. For example, an operator can use the keyboard 218 and/or a pointing device such as the mouse 220 to provide input to the computer 202.

The system 200 is simply provided for illustrative purposes and other configurations can be employed without departing from the scope and spirit of the invention. Computers with which the embodiment can be practised include EBM-PC/ATs or compatibles, one of the Macintosh (TM) family of PCs, Sun Sparcstation (TM), a workstation or the like. Many such computers use,graphical operating systems such as Microsoft Windows 95 and 98, for example. The foregoing is merely exemplary of the types of computers with which the embodiments of the invention may be practised. Typically, the processes of the embodiments are resident as software or a program recorded on a hard disk drive (generally depicted as block 212 in FIG. 2) as the computer readable medium, and read and controlled using the processor 204. Intermediate storage of the program and any data fetched from the network may be accomplished using the semiconductor memory 206, possibly in concert with the hard disk drive 212.

In some instances, the program may be supplied to the user encoded on a CD-ROM or a floppy disk (both generally depicted by block 212), or alternatively could be read by the user from the network via a modem device connected to the computer, for example. Still further, the computer system 200 can load the software from other computer readable medium. This may include magnetic tape, a ROM or integrated circuit, a magneto-optical disk, a radio or infra-red transmission channel between the computer and another device, a computer readable card such as a PCMCIA card, and the Internet and Intranets including email transmissions and information recorded on web sites and the like. The foregoing is merely exemplary of relevant computer readable mediums. Other computer readable mediums may be practised without departing from the scope and spirit of the invention.

In the foregoing manner, a method, an apparatus, a computer program product, and a system for converting video into multiple markup-language presentations are disclosed. While only a small number of embodiments are described, it will be apparent to those skilled in the art in view of this disclosure that numerous changes and/or modifications can be made without departing from the scope and spirit of the invention.

What is claimed is:

1. A method of converting a video into multiple markup language presentations for different devices and users, said method including the steps of:

creating a video database containing shot and key frame information of said video;

generating at least one of audio, visual and textual content for presentation dependent upon display capabilities of said different devices and user specified criteria, said generating step including the sub-steps of:

if said presentation is to contain visual content, determining a heuristic measure for a desired image for display on said different devices, said heuristic measure being dependent upon either a Display Dependent Significance Measure (DDSM), or said DDSM and a user supplied significance measure;

if said presentation is to contain visual content, ranking and selecting one or more images from said video to be displayed dependent upon said heuristic measure;

if said presentation is to contain audio content, extracting an audio stream from said video;

if said presentation is to contain textual content, selecting said textual content from video annotation and/or a transcript associated with said video; and creating multiple static and/or dynamic markup language documents dependent upon said display capabilities of said different devices and said user specified criteria for different presentations on said different devices, each document containing at least a portion of said generated audio, visual and textual content catering for a presentation on a corresponding device.

2. The method according to claim 1, further including the sub-step of, if said presentation is to contain visual content, converting said one or more selected images to different sizes and colour depths dependent upon respective display requirements of said devices.

3. The method according to claim 1, further including the sub-step of, if said presentation is to contain audio content, converting said audio stream to have different sampling rates, number of channels, compression ratios and/or resolutions for different delivery audio channels.

4. The method according to claim 1, further including the sub-step of, if said presentation is to contain textual content, generating said timed-transcript.

5. The method according to claim 1, wherein said presentations include synchronous and/or asynchronous combinations of audio, visual, and text content.

6. The method according to claim 1, wherein said combinations include synchronised audio with visuals, synchronised audio with text, synchronised audio with text and visuals, synchronised text and visuals, and static text with visuals.

7. The method according to claim 1, wherein said Display Dependent Significance Measure (DDSM) is dependent upon the information content of said image.

8. An apparatus for converting a video into multiple markup language presentations for different devices and users, said apparatus including:

means for creating a video database containing shot and key frame information of said video;

means for generating at least one of audio, visual and textual content for presentation dependent upon display capabilities of said different devices and user specified criteria, said generating means including:

means for, if said presentation is to contain visual content, determining a heuristic measure for a desired image for display on said different devices, said heuristic measure being dependent upon either a Display Dependent Significance Measure (DDSM), or said DDSM-and a user supplied significance measure;

means for, if said presentation is to contain visual content, ranking and selecting one or more images from said video to be displayed dependent upon said heuristic measure;

means for, if said presentation is to contain audio content, extracting an audio stream from said video;

means for, if said presentation is to contain textual content, selecting said textual content from video annotation and/or a transcript associated with said video; and means for creating multiple static and/or dynamic markup language documents dependent upon said display capabilities of said different devices and said user specified criteria for different presentations on said different devices, each document containing at least a portion of said generated audio, visual and textual content catering for a presentation on a corresponding device.

9. The apparatus according to claim 8, further including means for, if said presentation is to contain visual content, converting said one or more selected images to different sizes and colour depths dependent upon respective display requirements of said devices.

10. The apparatus according to claim 8, further including means for, if said presentation is to contain audio content, converting said audio stream to have different sampling rates, number of channels, compression ratios and/or resolutions for different delivery audio channels.

11. The apparatus according to claim 8, further including means for, if said presentation is to contain textual content, generating said timed-transcript.

12. The apparatus according to claim 8, wherein said presentations include synchronous and/or asynchronous combinations of audio, visual, and text content.

13. The apparatus according to claim 8, wherein said combinations include synchronised audio with visuals, synchronised audio with text, synchronised audio with text and visuals, synchronised text and visuals, and static text with visuals.

14. The apparatus according to claim 8, wherein said Display Dependent Significance Measure (DDSM) is dependent upon the information content of said image.

15. A computer program product having a computer readable medium having a computer program recorded therein for converting a video into multiple markup language presentations for different devices and users, said computer program product including:

means for creating a video database containing shot and key frame information of said video;

means for generating at least one of audio, visual and textual content for presentation dependent upon display capabilities of said different devices and user specified criteria, said generating means including:

means for, if said presentation is to contain visual content, determining a heuristic measure for a desired image for display on said different devices, said heuristic measure being dependent upon either a Display Dependent Significance Measure (DDSM), or said DDSM and a user supplied significance measure;

means for, if said presentation is to contain visual content, ranking and selecting one or more images from said video to be displayed dependent upon said heuristic measure;

means for, if said presentation is to contain audio content, extracting an audio stream from said video;

means for, if said presentation is to contain textual content, selecting said textual content from video annotation and/or a transcript associated with said video; and means for creating multiple static and/or dynamic markup language documents dependent upon said display capabilities of said different devices and said user specified criteria for different presentations on said different devices, each document containing at least a portion of said generated audio, visual and textual content catering for a presentation on a corresponding device.

16. The computer program product according to claim 15, further including means for, if said presentation is to contain visual content, converting said one or more selected images to different sizes and colour depths dependent upon respective display requirements of said devices.

17. The computer program product according to claim 15, further including means for, if said presentation is to contain audio content, converting said audio stream to have different sampling rates, number of channels, compression ratios and/or resolutions for different delivery audio channels.

18. The computer program product according to claim 15, further including means for, if said presentation is to contain textual content, generating said timed-transcript.

19. The computer program product according to claim 15, wherein said presentations include synchronous and/or asynchronous combinations of audio, visual, and text content.

20. The computer program product according to claim 15, wherein said combinations include synchronised audio with visuals, synchronised audio with text, synchronised audio with text and visuals, synchronised text and visuals, and static text with visuals.

21. The computer program product according to claim 15, wherein said Display Dependent Significance Measure (DDSM) is dependent upon the information content of said image.

* * * * *